(12) United States Patent
Harno

(10) Patent No.: US 6,678,368 B1
(45) Date of Patent: Jan. 13, 2004

(54) CALLING SUBSCRIBER VALIDATION

(75) Inventor: Jarmo Harno, Espoo (FI)

(73) Assignee: Nokia Corporation, Espoo (FI)

( * ) Notice: Subject to any disclaimer, the term of this patent is extended or adjusted under 35 U.S.C. 154(b) by 588 days.

(21) Appl. No.: 09/594,334

(22) Filed: Jun. 15, 2000

Related U.S. Application Data

(63) Continuation of application No. PCT/FI98/01018, filed on Dec. 23, 1998.

(30) Foreign Application Priority Data

Dec. 23, 1997 (FI) .................................................. 974628

(51) Int. Cl.$^7$ ............................. H04M 3/38; H04Q 3/64
(52) U.S. Cl. ............................ 379/221.01; 379/220.01; 379/201.05
(58) Field of Search ............................ 379/219–221.14, 379/201.02, 207.02, 207.11, 142.06

(56) References Cited

U.S. PATENT DOCUMENTS

| | | | |
|---|---|---|---|
| 5,436,957 A | * 7/1995 | McConnell | 379/88.23 |
| 5,473,681 A | 12/1995 | Partridge | |
| 5,754,640 A | 5/1998 | Sosnowski | |
| 5,940,472 A | * 8/1999 | Newman et al. | 379/10.02 |

FOREIGN PATENT DOCUMENTS

| | | |
|---|---|---|
| EP | 0669772 A2 | 8/1995 |
| WO | WO 98/25390 | 6/1998 |

* cited by examiner

*Primary Examiner*—Jack Chiang
*Assistant Examiner*—Hector Agdeppa
(74) *Attorney, Agent, or Firm*—Squire, Sanders & Dempsey L.L.P.

(57) ABSTRACT

The invention relates to calling subscriber validation in a telecommunications system which is divided into networks governed by at least two different operators and in which at least some of the subscribers connected to the network of a given operator also have access to the network of a neighbouring operator through the network of the given operator. To enable the validation to be carried out economically and with maximum utilization of the network transmission capacity, the network of the neighbouring operator uses a given predetermined node (SW4') for calling subscriber validation, and the connection setup process is continued in the network of the neighbouring operator from an internetwork link up to the predetermined node in which validation is performed in the connection setup phase. When the validation gives a positive result (a) the already established connection is released backwards from the predetermined node up to a given predetermined exchange, and (b) redirection of the call to the desired destination is performed from the predetermined exchange.

16 Claims, 5 Drawing Sheets

| MESSAGE TYPE | CAUSE INDICATORS | REDIRECTION NUMBER | | |
|---|---|---|---|---|
| RELEASE | #23 | ••• | ABCDE | ••• |

CALLING SUBSCRIBER VALIDATION

This applicatoin claims the benefit of U.S Provisional application No. PCT/F198/01018, filed Dec. 23, 1998.

FIELD OF THE INVENTION

The invention relates to validation of a calling subscriber in a telecommunications system in which at least some of the subscribers also have access to the network of another operator through the network of their operator (i.e., through the network to which the subscribers themselves are attached).

BACKGROUND OF THE INVENTION

With the liberalization of telecommunications legislation, new tele-operators have emerged in many countries who start competing with the old operators for customers. In such an environment, subscribers attached to the network of a given operator can make a call through the network of another operator by using a prefix identifying the desired-operator in front of the dialled number. From the point of view of said second operator, such subscribers have indirect access to the network of said operator. Such subscribers will be termed subscribers of indirect access in the following.

In many countries, however, operators are not obliged to carry out charging if a subscriber attached to their network desires to make a call through the network of another operator. In such cases, said second operator must carry out charging independently. Then a contract must be concluded between the customer (subscriber) and operator to the effect that the subscriber has access to the network of said operator even though the subscriber is attached to the network of another operator. In the connection setup phase, a check is made on the basis of which it is recognized whether said subscriber is entitled to access to the network. This operation is termed calling party validation.

FIG. 1 illustrates the different steps in connection setup when calling party validation is performed on the basis of which he is granted access to the network to which his terminal is not directly attached. The different steps are denoted with circled numbers 1 . . . 5. In the example shown in the figure, the calling subscriber SB1 is attached to the network of operator A, and said subscriber desires to place a call through the network of operator B.

When subscriber SB1 initiates a call that he desires to be established through the network of a given operator, he dials a prefix (XYZ) indicating the desired operator, in this exemplary case operator B, in front of the telephone number. This prefix and the number of the called subscriber, among other data, are sent in a standard initiation message to the subscriber's terminal exchange (step 1). At the terminal exchange SW1, a digit analysis is performed on the received number, in which connection it is found on the basis of the prefix itself that the call is intended to the network of operator B (step 2). The call attempt is thus routed to an inter-operator link IOL (step 3). The exchange SW2 located in the network of operator B, at the opposite end of the link IOL, comprises a database DB by means of which calling party validation is performed. This is effected by comparing the number of the calling subscriber (A number) with the valid numbers in the database (step 4). The validation process can be triggered at the exchange SW2 for example on the basis of the dialled prefix or on the basis of the incoming circuit group.

If the subscriber is found to be a valid subscriber, the call setup is continued in the normal way on the basis of the data of the call attempt (step 5). If, on the other hand, the number of the calling subscriber is not found from among the valid subscribers, the call is routed to a service from which additional information on the missing authorization is obtained, for example to a voice announcement or to a specific service number.

Seen on the network level, a calling subscriber validation of the above kind has been implemented either by the conventional technique as an exchange-based solution (as presented above) or as a solution based on an intelligent network.

FIG. 2 illustrates the above exchange-based solution on a network level. Calling subscriber validation is performed at each exchange (SW1', SW3') from which there is an inter-operator link (IOL) to the network of the neighbouring operator to which the subscribers of indirect access are attached. One drawback of this solution is that the maintenance and commissioning of the database is difficult, as the database must generally be located in several different exchanges (usually there are several interoperator links).

If, on the other hand, it is attempted to avoid the problem by performing the validation at one exchange only, transmission capacity is wasted, as in that case all calls are routed through the same validating exchange. At the same time, extra unwanted speech routes are created in the network. Neither is it worth-while to distribute the database in such a way that each validating exchange would only have information on some of the subscribers with indirect access, since in that case extra logic for routing calls through the correct exchange in each case should be created in the network.

These problems can be evaded by using the above-stated solution based on an intelligent network that has been illustrated in FIG. 3. In this case, the validation of the calling subscriber is performed in such a way that all exchanges from which there is an interoperator link to the exchange of a neighbouring operator send a validation enquiry to the service control point SCP at which the database (DB) of the valid subscribers is located. Depending on the response given by the SCP node, the call is routed either forward to the called number or to a service at which an announcement on missing authorization is given. Thus, the call setup is "frozen" at the exchange on the border of the network for the duration of the enquiry made to the SCP node and the call setup is continued with after a response has been obtained, to a destination dependent on the content of the response.

In practice, however, the technique based on an intelligent network is costly, for which reason implementation of calling subscriber validation is clearly a more expensive alternative than that using the conventional exchange-based technique. Since the check is a very simple operation and since the number of checks to be performed is high, it is not reasonable, either, to load the service control point too much by operations that could easily be realized using an exchange-based technique as well. Intelligent network resources should therefore preferably be reserved solely for more complex and demanding services.

SUMMARY OF THE INVENTION

It is an object of the invention to eliminate the drawbacks described above and to provide a method wherewith the advantages of the above prior art methods can be combined.

This object is achieved with a solution as defined in the independent claim.

The idea of the invention is firstly to maintain in a network, by using the conventional exchange-based technique, a validating node that is in common use by several exchanges on the border of the network wherefrom there is a link to an exchange of the neighbouring operator. In the preferred embodiment, the network of the operator only has one validating node. The idea is further to carry out the connection setup phase in such a way that the connection is established from said exchanges on the border of the network up to this predetermined validating node, but if the validation performed in the latter indicates that the subscriber is entited to access to the network, transmission capacity already allocated is released backwards for at least one link span. The release is carried out at least each time the called subscriber is not beyond the validating exchange. The release is preferably performed up to the exchange on the border of the network wherefrom there is an interoperator link to the network of the operator of the subscriber. This exchange performs redirecting of the call to the desired destination, and hence the speech path is not usually switched through the validating node. In one embodiment of the invention, the validating exchange does not even attend to call switching but only serves as a validity-checking node.

When the method of the invention is used, calling subscriber validation can be implemented economically, as the solution is founded on a conventional and inexpensive exchange-based technique. Since the established connection is released at least one link span backwards, no transmission capacity is wasted and no undesired extra speech paths are created in the network. Since, moreover, the validation is centralized, the commissioning and maintenance of the this function is as simple as possible.

BRIEF DESCRIPTION OF THE DRAWINGS

In the following, the invention and its preferred embodiments will be described in closer detail with reference to FIGS. 4–8 in examples in accordance with the accompanying drawings, wherein.

DETAILED DESCRIPTION OF THE INVENTION

To provide a background for the solution in accordance with the invention and to the description of the prior art provided above, the routing operations performed at a telephone exchange (FIGS. 4 and 5) and the digit analysis pertaining thereto (FIG. 6) are firs briefly illustrated.

Figure 4:
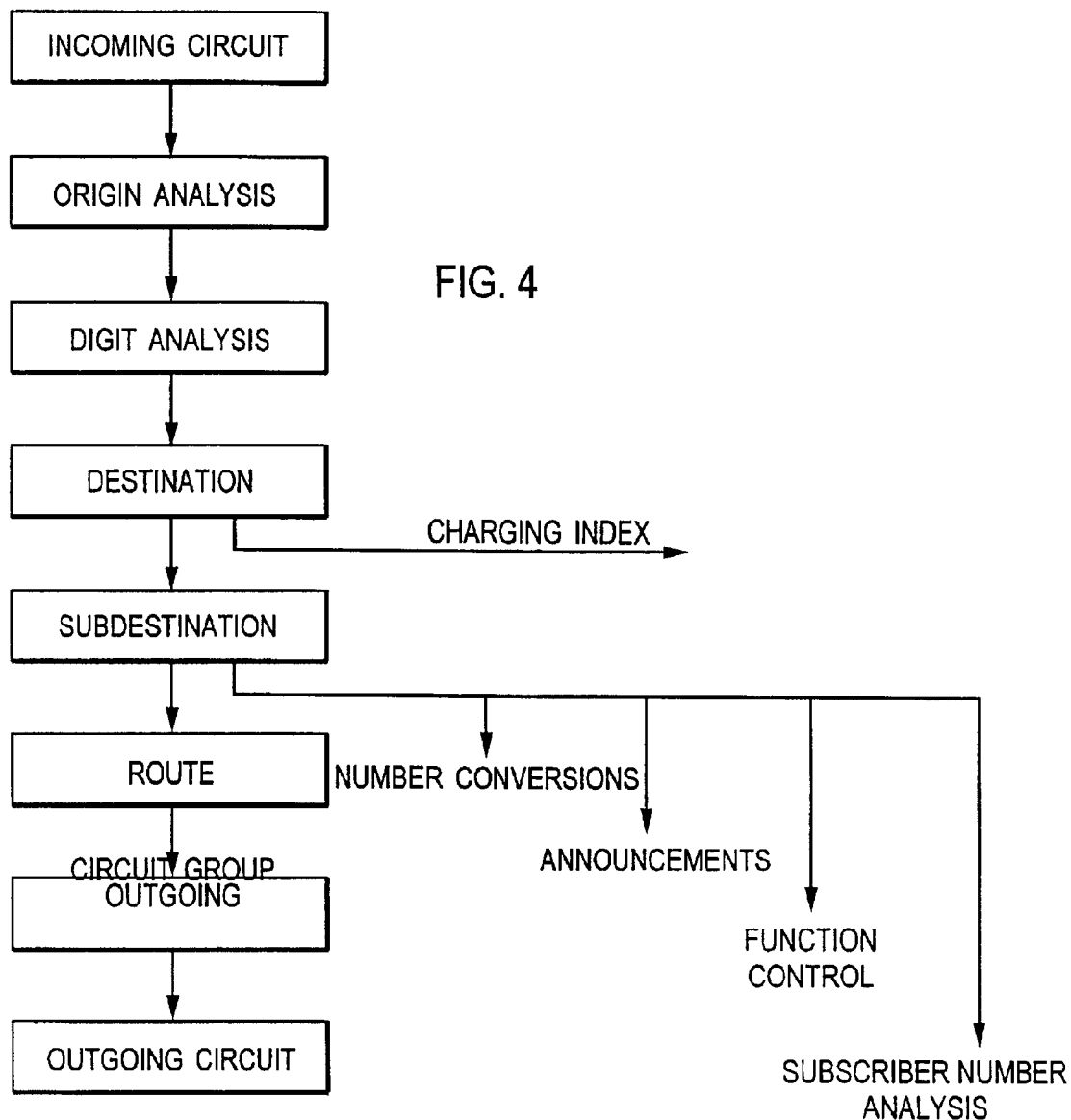
FIG. 4 illustrates routing operations carried out at an exchange.

The routing principle is—in accordance with FIG. 4—hierarchical in such away that origin and digit analyses are initially performed on the basis of the data on the calling subscriber and the dialled digits. The origin analysis is made to obtain information on the source of the call. Data relating to the subscriber may include, among other things, the origin of the incoming circuit group (or circuit) and the subscriber class of the calling subscriber. Hence, the same dialled series of digits received from different incoming circuit groups or from subscribers belonging to different classes may lead to different results. As a result of the analyses carried out, the above-stated destination is obtained. For example, the Applicants' DX 200 exchange may have 65000 destinations each of which may comprise 5 subdestinations. These subdestinations are typically divided into three main categories: connections to other exchanges, subscriber lines at the same exchange, and service prompts initiating a service. Such a service may be for example the above-stated voice announcement to be given to a subscriber or a more complex service that requires interaction with a more remote database (such as a service control point SCP in an intelligent network).

The destination also includes a so called charging index that is supplied to the charging analysis (not shown in the figure).

One destination typically includes information on several, for example five, subdestinations. The subdestinations may be arranged within the destination in a specific order of priority in such a way that one of them is the main routing alternative. If a congestion, for example, is found on said first subdestionation, the call may be transferred onto another subdestination.

Each subdestination is further connected to one outgoing or internal route or special route (number conversions, announcements, etc.) or to subscriber digit analysis. Thereafter the circuit groups connected to a given route are tested in a specific order in order to find a free circuit. A circuit in this context denotes a combination of two transmission channels enabling bidirectional transfer of signals between the subscribers. A circuit group, on the other hand, denotes a number of circuits having the same purpose of use.

When a call arrives at the exchange, the exchange typically creates a copy of the call control program and delivers it for the use of said call. The call control program, on the other hand, calls routing functions. The call control program attends the call until the call is terminated, whereafter the copy is deleted.

Figure 5:
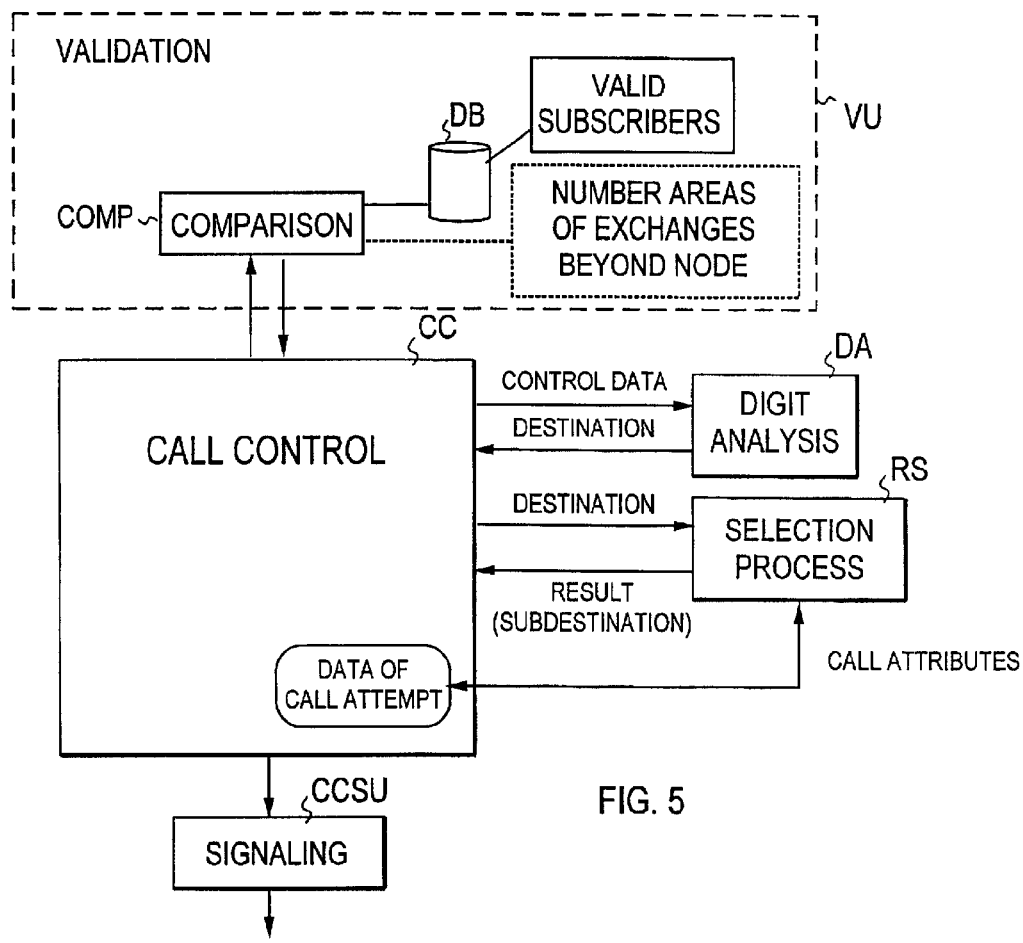
FIG. 5 illustrates routing as a part of call processing.

FIG. 5 illustrates the above functions and in what way the digit analysis and search of subdestination (for example a number conversion) form part of the call processing. The call control block CC supplies the control data (including, among other things, the dialled number and an indication of the analysis tree on the basis of which the digit analysis is carried out) to digit analysis block DA, which returns information on the destination corresponding to the dialled number to the call control block. Thus, the destination in this context refers to a group of traffic routing alternatives (i.e., subdestinations) that have been found on the basis of digit analysis and other information, such as the above-stated subscriber class and incoming circuit group. The call control block forwards these alternatives to a route selector block RS, which performs its analysis and returns the result to the call control block CC. This result is the above-stated subdestination. Data relating to the call attempt, known to the call control block CC, is utilized in the selection process.

In the above-described manner, the routine arrives at, for example, giving a voice announcement on the basis of the data of the call attempt (for example in a case where the calling subscriber is not entitled to access to the network).

In addition to the above blocks, FIG. 5 shows those functional blocks pertaining to call control which also relate to the implementation of the present invention. These blocks are the validation block VU and the common channel signalling block CCSU which generates the signalling messages used in the method under the control of the call control block CC. The database on valid subscribers can in practice be located for example in the central memory unit of the exchange or in a functional unit of its own. The operation of the validation block will be described in greater detail hereinafter.

The digit analysis carried out in connection with the routing at the exchange (for example the Applicants' DX 200 exchange) is based on a data structure in which the data records form a hierarchical tree structure. Each data record comprises e.g. 16 fields, one of which corresponds to a given key in a telephone set (0, 1, 2, . . . 9, *, #, etc. An individual field is either empty (i.e. is not in use and thus contains nothing) or contains a pointer. A pointer (which in practice is a binary number) can point either to the next data record or to a destination that is the result of a digit analysis. An empty field in practice means that no digit analysis is performed on the corresponding key in the telephone set.

Figure 6:
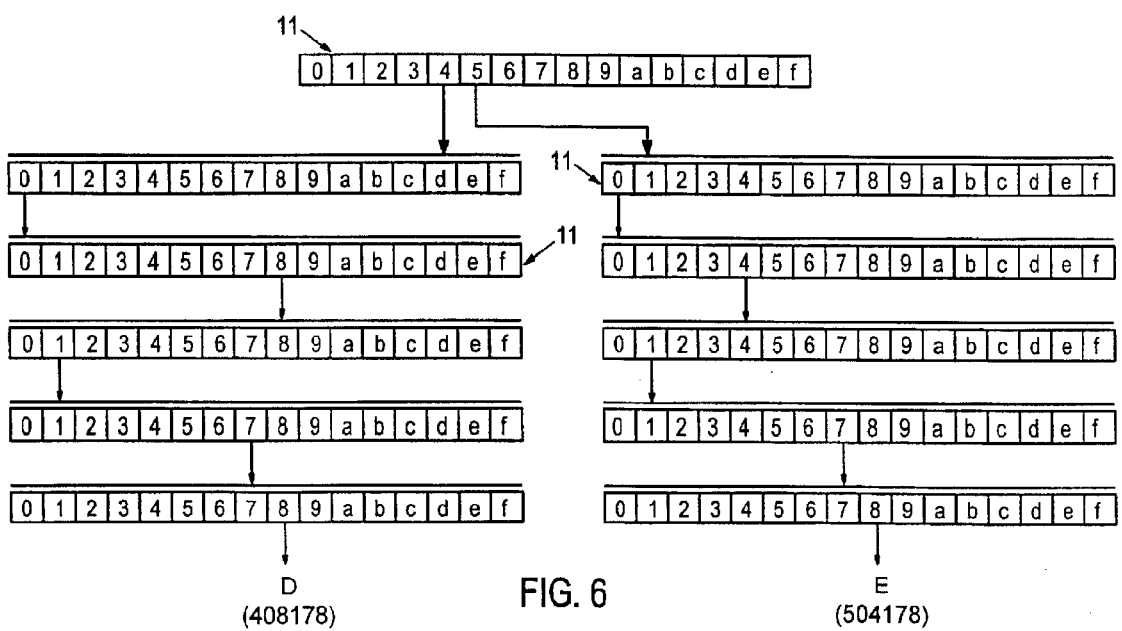
FIG. 6 shows a conventional data structure used for digit analyses.

FIG. 6 illustrates the above principle. The data structure comprises a number of data records 11, each having 16 fields denoted with references 0 . . . 9, a, . . . . f. For instance, an analysis performed on telephone number 408178 will return destination D and an analysis performed on telephone number 504178 will return the destination E. The analysis is performed by proceeding in the tree structure one dialled digit at a time, searching the content of the field corresponding to the dialled digit and proceeding to the data record pointed to by the pointer contained in said field, in which data record the content of the field corresponding to the next digit is searched, etc. The field corresponding to the digit that is searched last gives an analysis result (destination) that is supplied to the route selector block RS.

Figure 1:
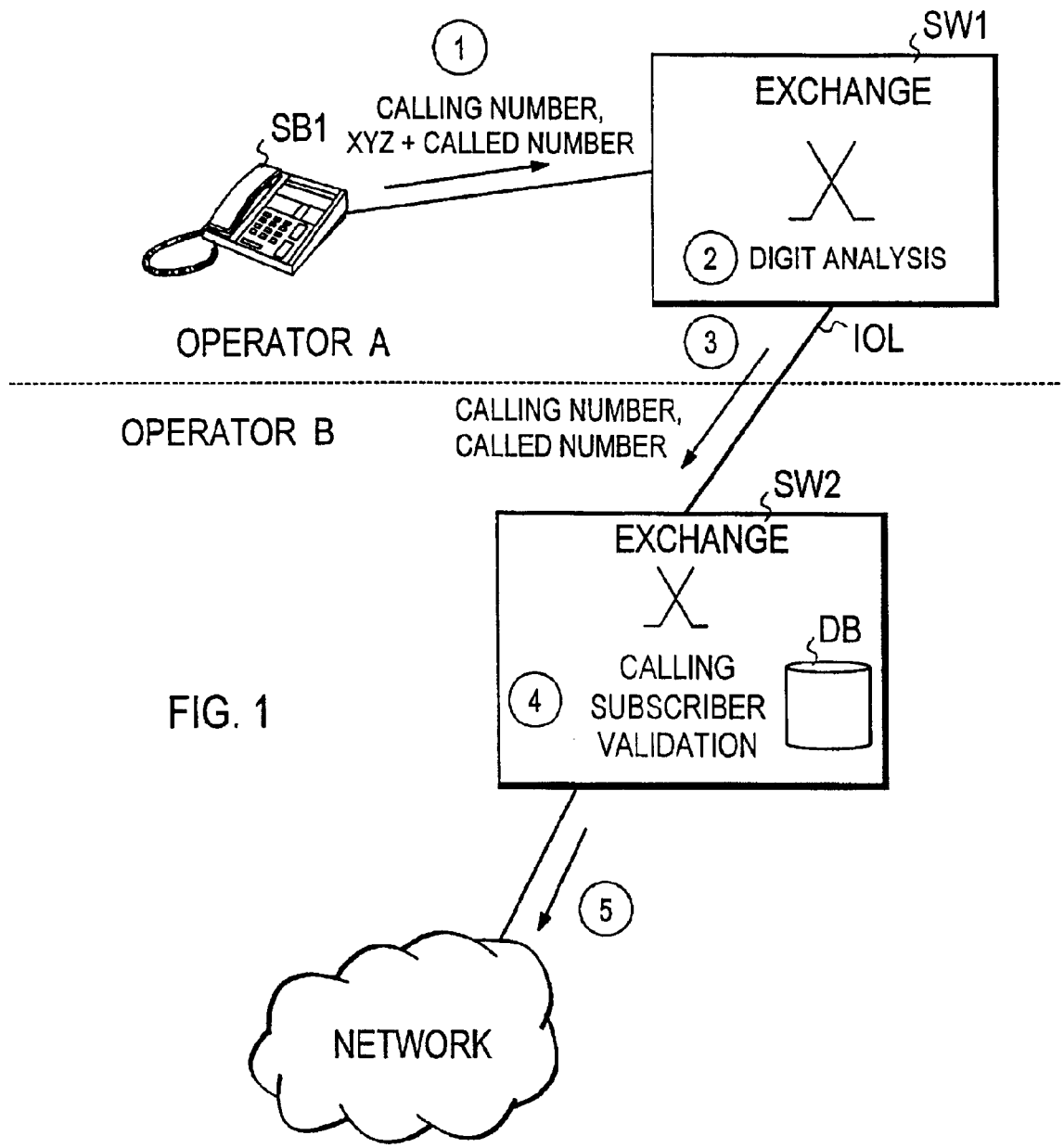
FIG. 1 illustrates calling subscriber validation.
Figure 2:
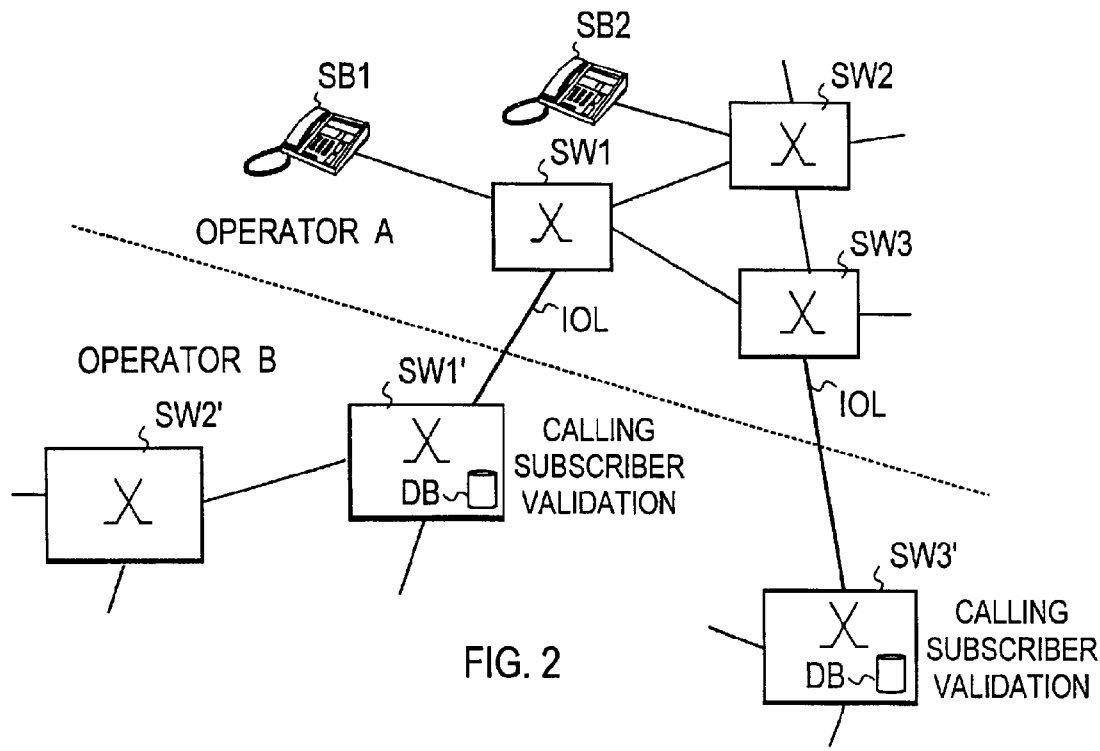
FIG. 2 illustrates a first known embodiment for calling subscriber validation on a network level.
Figure 3:
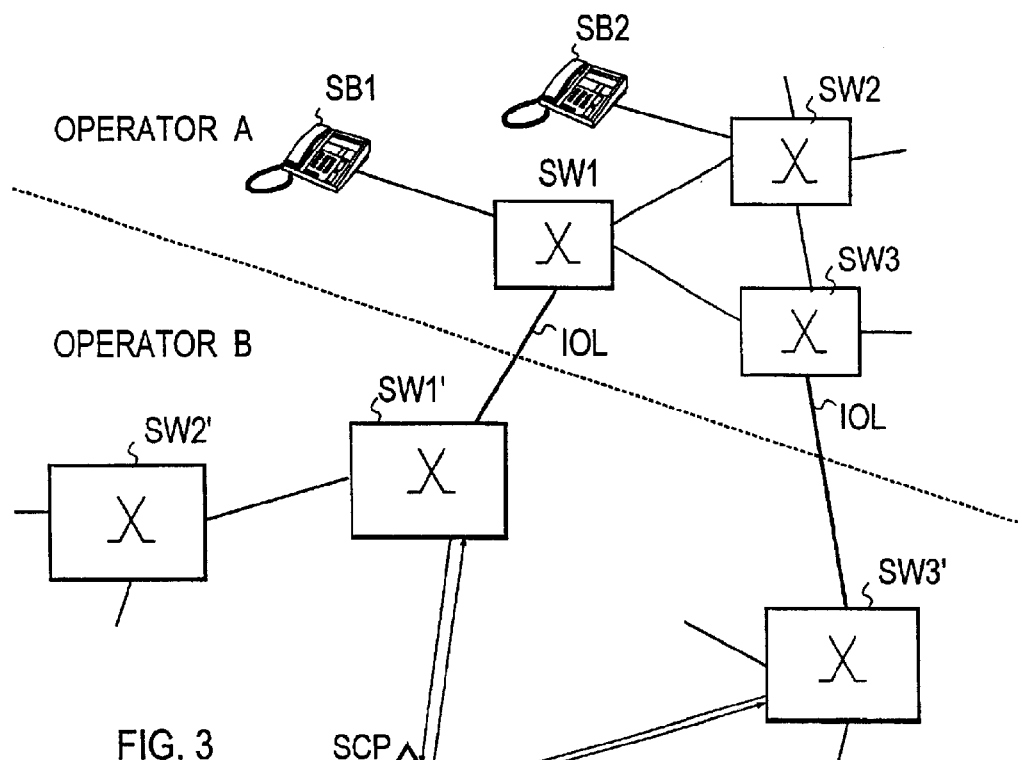
FIG. 3 illustrates a second known embodiment for calling subscriber validation on a network level.

The above is a brief description of the known basic functions of an exchange that are also utilized in present invention. In the following, the progressing of a call to be set up in accordance with the invention will be explained in detail with reference to FIG. 7, which shows a network of two operators in accordance with FIG. 2. In accordance with the invention, calling subscriber validation is dedicated to only one exchange of operator B. Even though the figure only shows one neighbouring operator, the same exchange can attend to the validation of calls arriving from the network of more than one neighbouring operators. This dedicated exchange can attend to subscriber validation only, or it can handle validation along with its other operations. In the former case, the exchange can be implemented as a very simple and stripped version. The use of such a validating exchange-based "server" is well-founded particularly when there is a large number of validity checks. Since the validating node is also in this case founded on an exchange-based technique, the term exchange is used therefor.

Let us assume that a subscriber SB1 in the network of operator A desires to make a call through the network of operator B. At the start of the connection set-up, the exchange SW1 receives information on the calling subscriber's desire to place a call. This information can arrive for example as a Setup message in accordance with standard Q.931, or the exchange can recognize closing of a subscriber loop as a result of the subscriber's lifting the receiver off hook (step 1). On the basis of the digit analysis performed on the received number (prefix) (step 2), the exchange (SW1) of the calling subscriber sends an initiation message through the signalling network to the network of operator B, to exchange SW1' (step 3). At this stage, the operator-specific prefix can be deleted from in front of the called number, even though the called number can still be processed in prefixed form as well. The initiation message to be sent may be either an initial address message (IAM) if the user part employed by the common channel signalling system is an ISDN user part ISUP, or an initial address message with additional information (IAI) if the user part employed is a telephone user part TUP. In the following, it will be presumed that the user part is ISUP.

The exchange SW1' performs a digit analysis, which is made in the analysis tree determined by the incoming circuit group (interoperator link) (step 4). By means of this analysis tree, all calls from said link are routed to validating exchange SW4' in the network of operator B. Exchange SW1' thus sends an IAM message (or an IAI message) further to exchange SW4' (step 5). The operator-specific prefix can be deleted also in this step, even though the called number can still be processed in prefixed form. On the other hand, at this stage a suitable prefix can also be inserted by which the call attempt is recognized when it is returned after validation for redirecting.

The calling subscriber validating exchange performs the validation by comparing the calling subscriber identifier that has arrived in the message to numbers stored in the database DB (step 6). The comparison can be performed on all incoming calls or only on calls selected by a given criterion, e.g. on those in which the first part of the number of the called subscriber corresponds to the identifier of the operator. In this sense, it is preferred to retain the prefix of the called number as well. A decision on validation can also be made for example on the basis of the incoming circuit group, for example; traffic on which validation is to be performed is routed to a different circuit group than traffic on which no validation need to be performed.

The validation process can be supplied e.g. with both the calling and the called number. If the calling number is found in the database, the process returns a release command, a release code and a number to which the call is redirected (which in this case is the same as the called number). If the calling number is not found in the database, the process returns instead a switching command and information on the destination to which routing is continued (for example a service point).

In a preferred embodiment of the invention, also the called number is used in the comparison; if a valid subscriber is concerned and the called number is in a given number area that belongs to exchanges beyond the validating exchange, the call need not be released backwards, but the call setup can be continued in a known manner directly forward from the validating exchange. In this way, back-and-forth release and reservation of the same link is avoided. The validating block VU shown in FIG. 5 above thus comprises comparator means COMP, which have two possible implementations. In the first implementation, they perform merely a first comparison in which the calling number is compared to the numbers of valid subscribers. In the second implementation, in addition to the first comparison they perform a comparison in which the called number is compared to the number areas of those exchanges which are beyond the node in the direction of arrival of the call attempt.

If the number of the calling subscriber is found in the database, the procedure is as follows. It should be noted that if the above preferred embodiment is used, the operation is as follows if the number of the calling subscriber is found in the database and the called number is not beyond the validating exchange. At the validating exchange, the (internal) release code is converted into a code in the release message to be sent backwards, indicating that the transmission capacity already allocated must be released as a result of the validation. For example, when ISUP signalling is used, cause indicator No. 23 which has been destined in the specifications specifically for this purpose, i.e. to effect release with redirection to new destination, can be used in the RELEASE message. Instead of cause indicator No. 23, some other cause indicator that has hitherto been left free in the specifications for operator-specific use can be used. Such cause indicators include indicators No. 10 . . . 15 and 24.

Figures 7, 8:
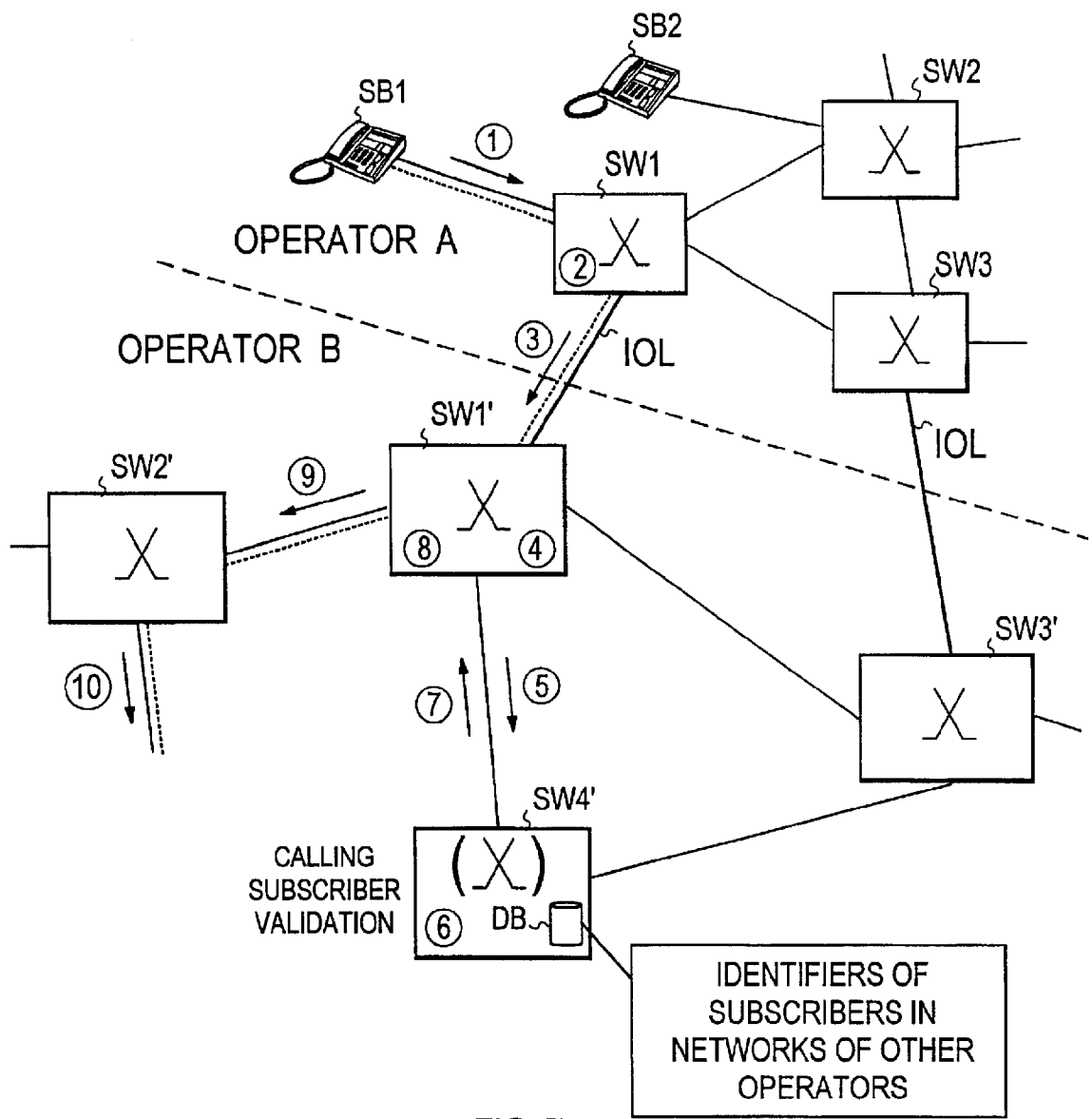
FIG. 7 illustrates the solution in accordance with the invention on a network level.
FIG. 8 illustrates a release message sent as a result of the validation.

FIG. 8 illustrates the RELEASE message sent back by the validating exchange SW4' (step 7). The message includes in the cause indicators field for example said cause indicator and in the redirection number field the number ABCDE to which the redirecting is effected. In the case of a valid subscriber, the number is the original called number and in the case of a non-valid subscriber the number of a desired service point in the event that it is desired to route calls of non-valid subscribers to a specific service point external of the validating exchange. Upon receiving this release message, the exchange SW1' performs a new digit analysis (step 8) on the basis of said number in the analysis tree determined by the cause indicator (and not in the analysis tree determined by the incoming circuit group, as previously in connection with the same call attempt). From hence onwards, the call attempt proceeds in the known manner to the desired subscriber or to a service point (steps 9 and 10). At least in the case of valid subscribers, the speech path is thus established via exchanges SW1 and SW1' directly to the desired subscriber. In other words, the speech path for valid subscribers does not pass through the validating exchange. The speech path being established is denoted with a broken line in FIG. 7. The only exception to this is possibly a situation in which the validating exchange also serves as a normal call-switching exchange, and furthermore at exchange SW1' the redirection takes place in the direction of the validating exchange. However, it is more reasonable to proceed in accordance with the above preferred embodiment, i.e. in such a way that routing of the call is continued directly forward from the validating exchange in the event that the called subscriber is beyond the validating exchange. In these cases, therefore, no release and redirection is performed. Direct routing forward is achieved in these cases in the above manner, i.e. in such a way that also the called number is checked in connection with the validation.

If the number of the calling subscriber is not found in the database DB, the procedure can be similar to that of the prior art method, that is, the call can be routed to a voice announcement or a service number. In such a case, therefore, a part of the speech path already allocated is not released, but the connection setup is continued further and the call is routed either to a voice announcement given from the same exchange or to a service point (help desk) external to the exchange. The last-mentioned alternative presupposes that the validating exchange also serves as a normal exchange through which the speech path is switched. Alternatively, the procedure could be such that a part of the already established connection is released, similarly as in the case of a valid subscriber, for example up to an exchange on the border of the network or up to the preceding exchange, and thereafter a voice announcement on the missing authorization is given or redirection to the desired service point is performed at said exchange. If the release message employed does not contain the number of the service point to which the redirecting is effected or the code of the voice announcement to be given, it must contain a cause indicator of its own in order that the situation may be distinguished from redirection effected for a call attempt by a valid subscriber. The release is also carried out in the event that the validating exchange only serves as a validity-checking server (through which no speech path is switched) and it is desired to route the call to a specific service point in the network, for instance.

The sending of the release message from the validating exchange can also be generated in such a way that when the number of the calling subscriber is found, the routing is directed to take place in a predetermined analysis tree that has intentionally been left empty (the analysis data are missing). This solution has the advantage that the connection can be released with very small changes to the existing exchange configuration (e.g. the Applicants' DX 200 exchange). Even nowadays an end of selection (EOS) analysis is always performed at the exchange when a call attempt is unsuccessful. The analysis analyzes the internal release code of the exchange, which indicates the reason for the failure. In this case, the release code indicates that the number was not found in said analysis tree. On the basis of the code, the exchange automatically generates a release message backwards. The internal code can be converted very simply into a desired code for the release message to be sent backwards. In this case, however, the message does not include a number to which the redirection is to be effected (since the message is not intended to trigger redirection). However, this is no disadvantage if the exchange on the border of the network has stored the original called number. At this exchange, the cause indicator used in the release message is then interpreted as redirection effected on the basis of the original called number in the analysis tree determined by the release code. If, therefore, the release message used is such that it includes no number to which redirection is effected, the exchange on the border of the network must have stored the original called number. The call attempt relating to the received release message is identified in a known manner (for example by means of the circuit identification code CIC contained in the message).

If the validating exchange simultaneously serves as a normal exchange, in using an empty analysis tree "validation calls" can be distinguished from "genuine" situations—in which the exchange cannot find the number in the analysis tree in connection with call set-up—specifically on the basis of the analysis tree, for example. It is not necessary to make the distinction, however, since at the exchange (SW1') on the border of the network the call will in any case receive the correct release code and will be released in the correct manner. If the validating exchange serves merely as a validator of subscribers, there is no need for making such a distinction either.

If the validating exchange operates as a server merely checking the rights of subscribers, it can be implemented as a "stripped" exchange in such a way that it only comprises those parts of an exchange that are needed for the above-described functions. The exchange thus comprises at its minimum only the parts realizing call control, parts enabling the database query relating to the validation, and signalling means operating on the basis of the validation. The node may have an interface in the direction of one or more neighbouring nodes. In principle, it is also possible to "strip" the protocol employed. Facilities that are not indispensable can thus be omitted, even though the same protocol whereby the call is established and released is still concerned.

If there are one or more exchanges between the validating exchange (SW4') and the exchange (SW1') on the border of the network, it is preferable to earmark the cause indicator employed to signify in these exchanges release of the connection backwards and only in the exchange on the border of the network redirection to a given number. Thus, it is more advantageous to perform redirection from an exchange on the border of the network than from an exchange between the validating node and the exchange on the border of the network, since in this way the speech paths are established along optimal routes. In principle it is possible, however, to perform redirection from any exchange that is along the route already allocated in the network of said operator.

Even though the invention has been explained in the following with reference to examples in accordance with the accompanying drawings, it is obvious that the invention is not restricted thereto, but it can be modified within the scope of the inventive idea set forth in the appended claims. For example, the release and redirection mechanisms can vary depending on the signalling methods used. Thus, a standard release message earmarked by means of a specific cause indicator or for example a separate operator-specific message reserved for this purpose can be used. What is essential is only that the interpretation of the cause indicator or message is unequivocal at both ends of the circuit. The internal configuration of the exchange can also vary in many ways as regards the manner of carrying out the validation and the resulting generation of a release message. There may also be several validating exchanges, so that a certain exchange serves a certain area, but it is advantageous in view of commissioning and control that only one exchange carries out validation. Neither need the validation necessarily be performed in the network of a neighbouring operator, but it can also be performed at a more remote location from the subscriber. The term "neighbouring operator" used thus does not necessarily mean the network of an adjacent operator if there are more than two operators. In the case of non-valid subscribers, further services or analyses may also be realized out either in the validating node or at an external service point. In the latter case, the called number can also be returned with a suitable prefix indicating the further service or analysis used.

What is claimed is:

1. A method for calling subscriber validation in a telecommunications system which is divided into networks governed by at least two different operators and in which at least some of the subscribers connected to the network of a given operator also have access to the network of a neighbouring operator through the network of said given operator, said validation being performed when the subscriber makes a call attempt to the network of the neighbouring operator, wherein in the set-up phase of such a call comprises
    allocation of transmission capacity link by link starting from the exchange of the calling subscriber, whereby the connection is established to the network of the neighbouring operator through an inter-network link,
    performing validation for, checking whether the calling subscriber is entitled to access to said network, in a validating node of exchange-based technique in the network of said neighbouring operator,
    continuing a connection set-up process in the network of the neighbouring operator from the inter-network link up to said validating node,
    wherein when the validation gives a positive result the setup phase of such a call further comprises:
        releasing the already established connection backwards from said validating node up to a given exchange, and
        redirecting the call to the desired destination from said given exchange.

2. A method as claimed in claim 1, wherein the validating node stores the numbers of subscribers entitled to access to the network of the neighbouring operator, the validation being performed by comparing the calling number to the stored numbers, and
    it is regarded as the positive result that the validation shows that the calling subscriber is entitled to access to the network of the neighbouring operator.

3. A method as claimed in claim 1, wherein the validating node stores the numbers of subscribers entitled to access to the network of the neighbouring operator, the validation being performed by comparing the calling number to the stored numbers and additionally comparing the called number to the number areas belonging to exchanges beyond the validating node
    it is regarded as a positive result that the validation shows that the calling subscriber is entitled to access to the network of the neighbouring operator and the called number does not belong to said number areas.

4. A method as claimed in claim 1, wherein the already established connection is released backwards up to an exchange that is the termination of the inter-network link in the network of the neighbouring operator.

5. A method as claimed in claim 1, wherein the network of the neighbouring operator only uses one node for calling subscriber validation.

6. A method as claimed in claim 1, wherein when the validation indicates that the calling subscriber is not entitled to access to the network, the call is redirected to a voice announcement service.

7. A method as claimed in claim 1, wherein when the validation indicates that the calling subscriber is not entitled to access to the network, the call set-up is continued forward from said validating node to a destination external to the node.

8. A method as claimed in claim 1, wherein a standard release message including information on the cause of the release is sent backward from said validating node.

9. A method as claimed in claim 8, wherein information on the destination to which the redirection is to be effected is further included in the release message.

10. A method as claimed in claim 1, wherein validation is performed only on those call attempts in which the called number includes the identifier of said operator.

11. A method as claimed in claim 1, wherein when it is found on the basis of the validation that the calling subscriber is entitled to access to the network, the routing of the call attempt is directed to an analysis tree that is empty.

12. A telecommunications system which is divided into networks governed by at least two different operators and in which at least some of the subscribers connected to the network of a given operator also have access to the network of a neighbouring operator,
    wherein the network of at least one operator has
        a validating node of exchange-based technique comprising validating means for validating calling subscribers of call attempts originating from the network of a neighbouring operator,
        in exchanges directly connected to the network of the neighbouring operator, routing means for routing call attempts arriving from the network of a neighbouring operator to the validating node irrespective of the called number of the call attempt, and
        in the validating node, release means responsive to the validating means for releasing already allocated transmission capacity backwards.

13. A telecommunications system as claimed in claim 12, wherein the validating node only performs validation, the speech paths for the calls passing through the other nodes of the network.

14. A telecommunications system as claimed in claim 12, wherein the validating node also performs call switching.

15. A telecommunications system as claimed in claim 12, wherein the validating means comprise comparator means for comparing the calling number to the numbers of valid subscribers stored in the validating node.

16. A telecommunications system as claimed in claim 12, wherein the validating means comprise comparator means for comparing the calling number to the numbers of valid subscribers stored in the validating node and additionally the called number to the number areas belonging to exchanges beyond the validating node.

* * * * *